United States Patent [19]

Koseki et al.

[11] Patent Number: 5,702,810
[45] Date of Patent: Dec. 30, 1997

[54] CUSHIONING COMPOSITE MOLDED ARTICLE AND A PROCESS FOR PRODUCTION THEREOF

[75] Inventors: Toshinori Koseki, Kamakura; Kunio Maeda, Tokyo; Syoichi Kanno, Machida, all of Japan

[73] Assignee: Mitsubishi Chemical Corporation, Tokyo, Japan

[21] Appl. No.: 508,243

[22] Filed: Jul. 27, 1995

Related U.S. Application Data

[63] Continuation of Ser. No. 150,146, filed as PCT/JP93/00290, Mar. 10, 1993, abandoned.

[30] Foreign Application Priority Data

Mar. 10, 1992 [JP] Japan .................... 4-086092

[51] Int. Cl.$^6$ .......................... B29C 44/06; B29C 44/12; B32B 5/20
[52] U.S. Cl. ................. 428/318.8; 264/45.5; 264/46.4; 264/255; 264/328.7; 428/328.6; 428/319.7
[58] Field of Search .................. 264/328.7, 255, 264/46.6, 46.5, 46.4, 53, 54, 45.5; 428/304.4, 319.3, 319.7, 318.8, 310.5, 318.6

[56] References Cited

U.S. PATENT DOCUMENTS

| | | | |
|---|---|---|---|
| 3,305,895 | 2/1967 | Ludwig | 264/255 |
| 3,767,742 | 10/1973 | Robin | 264/328.7 |
| 3,793,415 | 2/1974 | Smith | 264/328.7 |
| 3,991,146 | 11/1976 | Barrie | |
| 4,092,385 | 5/1978 | Balevski et al. | 264/328.7 |
| 4,096,219 | 6/1978 | Mollenbruck et al. | 264/46.4 |
| 4,133,858 | 1/1979 | Hayakawa et al. | 264/328.7 |
| 4,242,391 | 12/1980 | Reinhardt et al. | 264/46.4 |
| 5,116,557 | 5/1992 | Debaes et al. | 264/255 |
| 5,281,376 | 1/1994 | Hara et al. | 264/328.7 |
| 5,292,465 | 3/1994 | Kobayashi et al. | 264/328.7 |

FOREIGN PATENT DOCUMENTS

| | | | |
|---|---|---|---|
| 2618683 | 2/1989 | France | 264/255 |
| AS 1 282 294 | 7/1968 | Germany . | |
| 24 16 694 A1 | 10/1975 | Germany . | |
| 25 14 243 A1 | 10/1975 | Germany . | |
| 49-010967-A | 1/1974 | Japan . | |
| 63-227313 | 9/1988 | Japan . | |
| 1-249416 | 10/1989 | Japan . | |
| 1351199 | 4/1974 | United Kingdom | 264/255 |
| 93 23237 | 11/1993 | WIPO | 264/255 |

OTHER PUBLICATIONS

McGregor, "Developments in Injection Moulding–1", *Applied Science*, (1978), pp. 152–153.

Dym. B., "Foamed Engineering Plastics Molding and Molds,", *Injection Molds and Molding*, 1979 pp. 336–341.

D.H. Morton–Jones, "Developments in Injection Moulding–3", *Applied Science*, (1985), pp. 1–9.

*Primary Examiner*—Allan R. Kuhns
*Attorney, Agent, or Firm*—Pennie & Edmonds LLP

[57] ABSTRACT

The present invention relates to a cushioning composite molded article obtained by forming a cushioning material having a surface material on a rigid substrate integrally, and a process for producing the composite molded article by a simple procedure involving a small number of steps for production, and

- when a rigid-resin molded product is set in a mold and an expandable elastomer is injected, after which the inside of the mold is enlarged to expand the substance,
- the expanded elastomer becomes a cushioning material and its skin layer becomes a surface material, and the formation of them and the union in a body of them and the rigid substrate, i.e., the rigid-resin molded product can be carried out in one mold in succession, so that the production is easy and that labor and the production cost are saved.

16 Claims, 3 Drawing Sheets

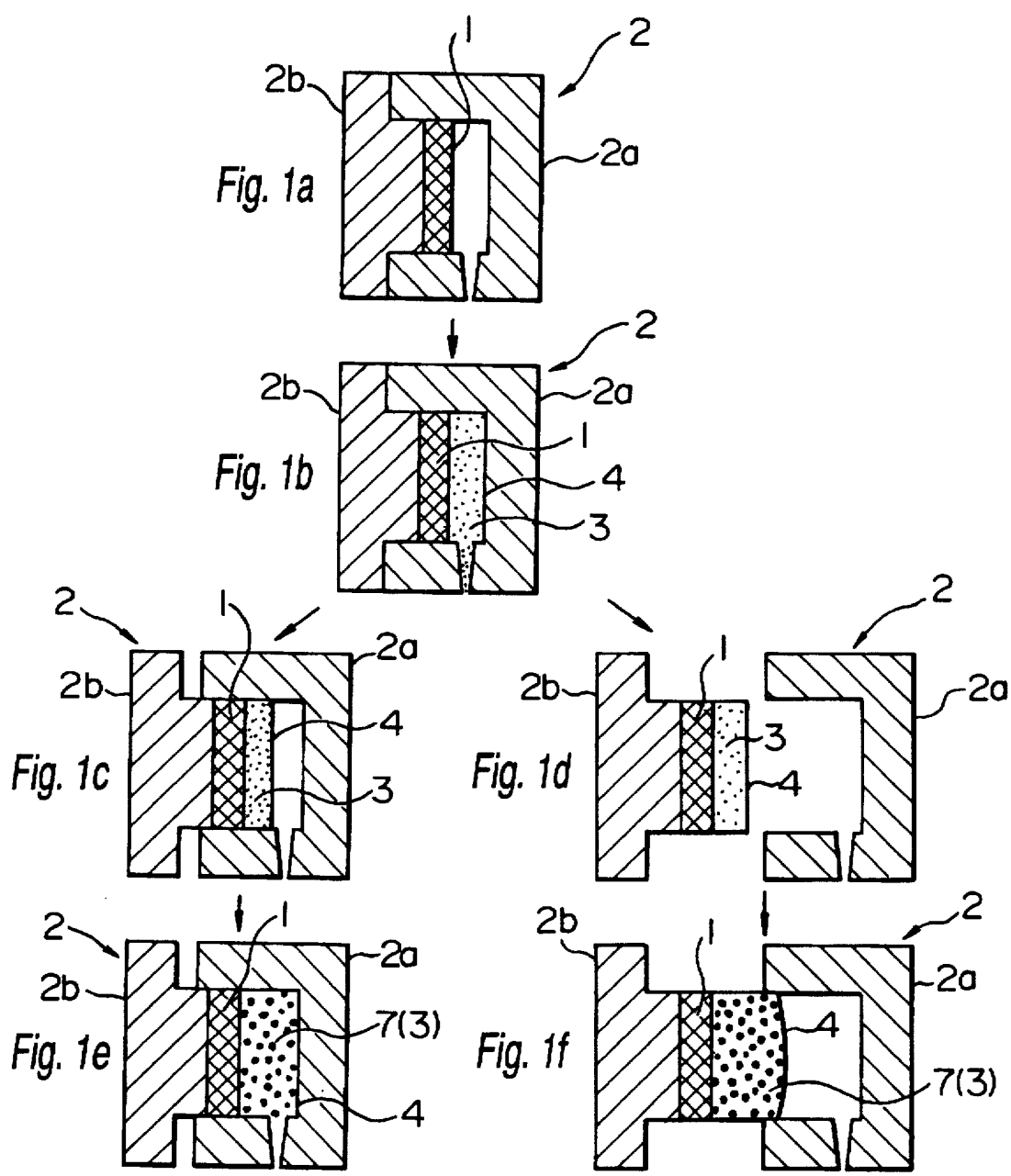

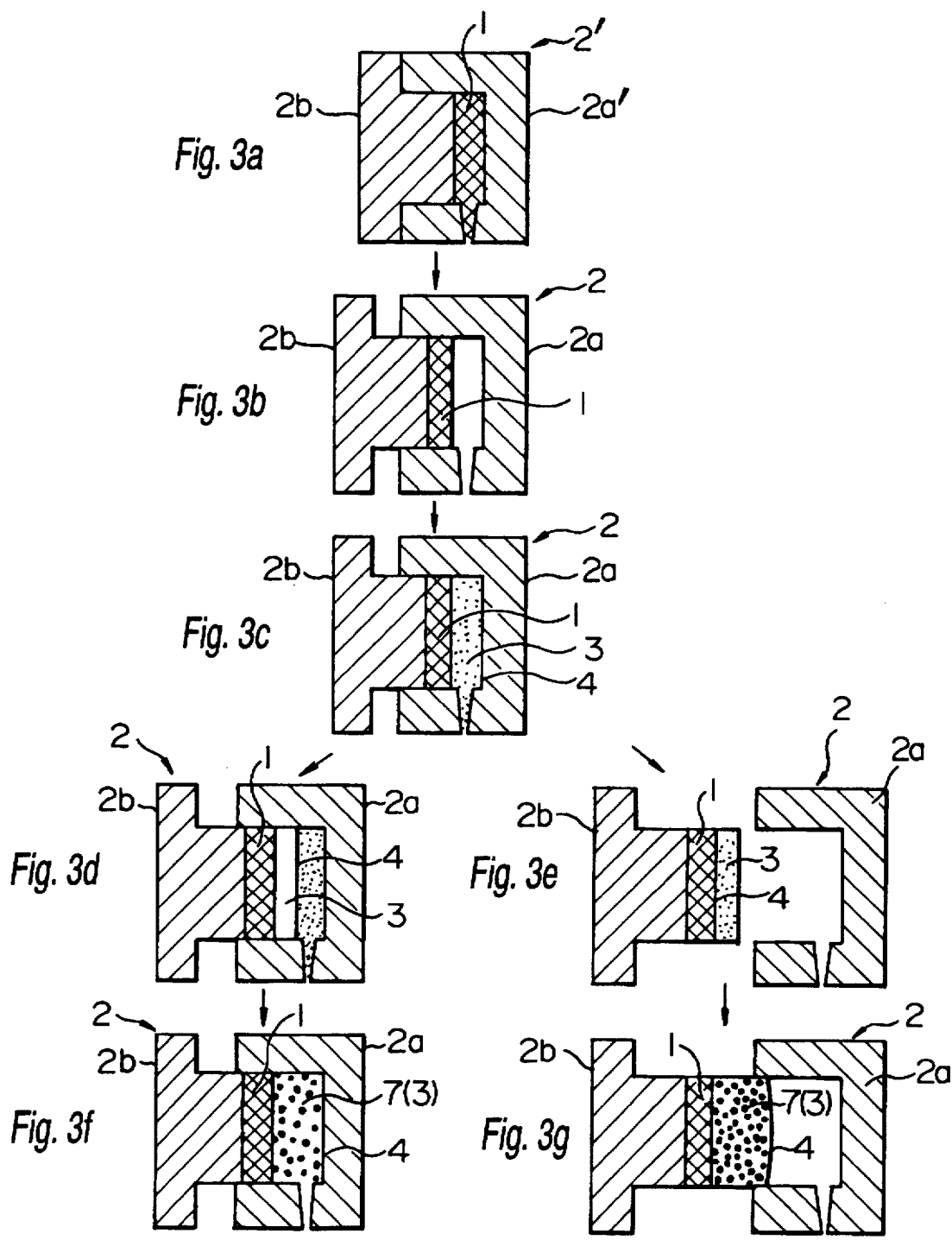

CUSHIONING COMPOSITE MOLDED ARTICLE AND A PROCESS FOR PRODUCTION THEREOF

This is a continuation of application Ser. No. 08/150,146, filed as PCT/JP93/00290 Mar. 10, 1993, now abandoned.

<TECHNICAL FIELD>

The present invention relates to a cushioning composite molded article comprising a rigid substrate and a cushioning material integrally formed on said rigid substrate and coated with a surface material, and a process for producing the same. More particularly, the present invention relates to a cushioning composite molded article having a rigid substrate for attaining a certain strength and a surface material-coated cushioning material for attaining an excellent appearance and a soft feel, which is used, for example, in parts and products of automotive trims (instrument panel, door panels, seat back panels, steering wheel, pulls, etc.), furniture (seating part of chair, etc.), sundries (shoes, slippers, etc.), and the like.

<BACKGROUND ART>

As processes for producing a cushioning composite molded article, the following processes have been known.

(1) A process comprising producing a surface material by vacuum forming of a semirigid vinyl chloride resin into a semirigid vinyl chloride sheet or by slash molding of semirigid vinyl chloride resin powder, producing rigid substrate by injection-molding a polypropylene, an AS resin, an ABS resin or the like, placing said surface material and said rigid substrate in a mold, injecting an expandable polyurethane between the surface material and the rigid substrate, and expanding the polyurethane to obtain a cushioning material.

(2) A process in which a laminate of a surface material and a cushioning material which is obtained by bonding a semirigid vinyl chloride sheet and an expanded crosslinked polypropylene sheet to each other with an adhesive is adhered to a rigid substrate separately obtained by injection molding, by vacuum forming.

(3) A process comprising setting in a mold a laminate of a surface material and a cushioning material which is obtained by bonding a semirigid vinyl chloride sheet and an expanded crosslinked polypropylene sheet to each other with an adhesive; injecting a rigid resin into a lower mold constituting said mold to mold a rigid substrate; and thereby uniting the rigid substrate and the laminate of a surface material and a cushioning material in a body.

All of the above conventional processes, however, are disadvantageous in that they involve a large number of steps for production, require much labor and entail great cost because in all the processes, products individually obtained by forming or molding, i.e., a surface material made of a non-expandable material, a cushioning material obtained by expansion of an expandable elastomer, and a rigid substrate molded using a rigid-resin, are united in a body to obtain a product.

For solving these problems, many processes have been developed but all of them have defects.

Japanese Patent Unexamined Publication No. 1-249416 discloses a process for producing a molded article of flexible resin which comprises inserting a resin insert made of a polyolefin into a mold, injecting a thermoplastic elastomer material containing a blowing agent into the mold in an amount smaller than the capacity of said mold (this operation is hereinafter referred to as "short shot"), expanding the thermoplastic elastomer material in the mold to form a non-expanded skin, adhering or heat-fusing a flexible-resin coat having said skin to said insert, and thereby producing a flexible-resin molded article (insert•short shot process).

However, in this process, there cannot be obtained a molded article having a small thickness, a high expansion ratio and a correct transcript of the surface pattern of the mold. The molded article produced by this process has a markedly rough surface, that is, characteristic of an expanded molded article obtained by a short shot process. Thus, there cannot be obtained a molded article intended according to the present invention, i.e., a molded article having a surface similar to that of, for example, natural leather which can be obtained only by correct transcription of the surface pattern of a mold.

Japanese Patent Unexamined Publication No. 49-10967 discloses a process for producing a multilayer structure having a polyolefin foam layer which is characterized by placing a strength-maintaining material previously in a mold for injection molding which has a cavity capable of increasing its capacity while holding therein a molten resin, injecting a plastified expandable polyolefin resin into said mold cavity, and then increasing the capacity of said cavity to expand the polyolefin (insert•space-in-mold enlarging process).

However, since polyolefins do not have a good rubber-like elasticity which saturated-type styrene-based substances have, this process characterized by expanding a polyolefin cannot give a cushioning composite molded article of high quality having a soft and pleasant feel which is intended according to the present invention.

Japanese Patent Unexamined Publication No. 63-227313 discloses an injection-molded article of flexible resin comprising a resin insert and a flexible-resin coat, wherein the resin insert is made of a polyolefin resin, the flexible-resin coat is made of a styrene-based thermoplastic elastomer having a hardness (JIS K6301: type A) of 10 to 50 and a compression set (JIS K6301: 70° C.×22 h) of 70% or less, and the thickness of the flexible-resin coat is 0.5 mm or more (insert•on-expanded molded product).

This molded article is obtained by a conventional insert•non-expansion injection molding method. The conventional insert•non-expansion injection molding method permits production of a thin molded article having a correct transcript of the surface pattern of a mold but cannot give a cushioning composite molded article of high quality having a soft and pleasant feel which is intended according to the present invention.

<SUMMARY OF THE INVENTION>

An object of the present invention is to provide a cushioning composite molded article of high quality obtained by uniting in a body a flexible surface material composed of an elastomer which is made of a non-expanded product, a cushioning material formed by expansion of an elastomer, and a rigid substrate composed of a molded product of rigid resin. Another object of the present invention is to provide a process for producing said composite molded article through a small number of steps at low cost. More specifically, the present invention permits the following production: a cushioning composite molded article comprising a rigid substrate, a surface material having good appearance and feel similar to those of, for example, natural leather, and a cushioning material coated with said surface material and formed on said rigid substrate is produced through a small number of steps for production, at a low production cost by setting a previously produced molded product of rigid resin as a rigid substrate in a mold having a space larger than the rigid-resin molded product, injecting an expandable elastomer into the space so as to achieve full shot into the mold, forming a layer of the expandable elastomer integrally on the rigid substrate, and then enlarging the mold cavity to expand the layer of the expandable elastomer (insert•space-in-mold enlarging process); or a cushioning composite molded article comprising a rigid substrate, a surface material having good appearance and feel similar to those of, for example, natural leather, and a cushioning material coated with said surface material and formed on said rigid substrate is produced through a small number of steps for production, at a low production cost by injecting a rigid resin into a mold to fill the mold therewith completely, thereby obtaining a molded product of the rigid resin as a rigid substrate, enlarging the inside of the mold after cooling, injecting an expandable elastomer into the space in the mold which has been formed by the enlargement, to fill the mold with said substance completely, forming a layer of the expandable elastomer integrally on the rigid substrate, and then further enlarging the inside of the mold to expand the layer of the expandable elastomer (two layer molding•space-in-mold enlarging process).

In other words, the present invention relates to a process for producing a cushioning composite molded article comprising a rigid substrate and a cushioning material integrally formed on said substrate, the surface of said cushioning material having a correct transcript of the surface pattern of a mold and having an excellent appearance and a soft feel, which process comprises setting a rigid substrate previously molded in a desired shape, in a mold having a space larger than said rigid substrate, or injecting a rigid resin into a mold of a desired shape to form a rigid substrate, followed by enlarging the inside of the mold so as to form a space, thereafter injecting an expandable elastomer into the space to form integrally on the rigid substrate a layer of the expandable elastomer which has been coated with a surface material formed as a skin layer having a correct transcript of the surface pattern of the mold, and then enlarging the mold cavity to expand the aforesaid layer of the expandable elastomer, and thereby forming a cushioning material coated with the above-mentioned surface material; and a cushioning composite molded article produced by said production process.

<BRIEF DESCRIPTION OF THE DRAWINGS>

FIGS. 1(a)–1(f) illustrate the production process of the first embodiment according to the present invention.

FIGS. 3(a)–3(g) illustrate the production process of the second embodiment according to the present invention.

<BEST MODE FOR CARRYING OUT THE INVENTION>

Figure 2A:
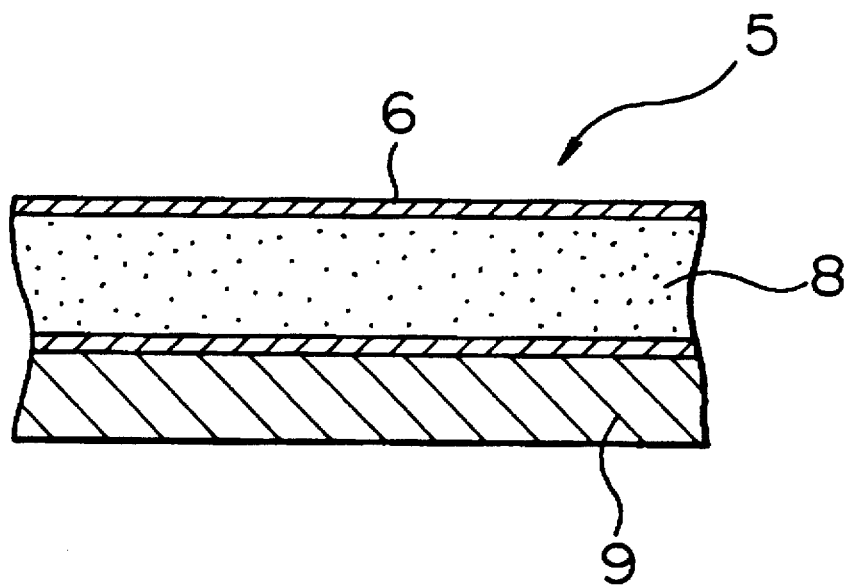
FIGS. 2(a) and 2(b) show cross-sectional views of the cushioning composite molded article according to the present invention.

The present invention relates to the above-mentioned production processes (the insert•space-in-mold enlarging process and the two-layer molding•space-in-mold enlarging process) and molded articles produced by the production processes, and is based on the finding that a cushioning composite molded article of high quality comprising a rigid substrate and a cushioning material coated with a surface material having good appearance and feel similar to those of, for example, natural leather can be produced through a small number of steps for production, at low cost by the use of a specified elastomer and proper determination of molding conditions (the temperature of the inner surface of a mold, the interval between the completion of injection and the initiation of the backward movement of a movable mold, etc.), without employing a dangerous process in which a high-pressure gas is previously introduced into the space in a mold (counter pressure process).

The thermoplastic elastomer in the present invention constitutes the surface material and the cushioning material. As the elastomer, a saturated-type styrene-based elastomer is used. As the saturated-type styrene-based elastomer, there is preferably used a saturated-type styrene-based elastomer and having an average molecular weight of not more than 70,000 and more than 30,000 as measured by a GPC method and an A hardness according to JIS K6301 of not more than 100 and more than 50. The saturated-type styrene-based elastomer may be either a saturated-type styrene-butadiene based elastomer or a saturated-type styrene-isoprene based elastomer.

A saturated-type styrene-based elastomer and having an average molecular weight of more than 70,000 does not expand well when the process of the present invention is employed. In the case of a saturated-type styrene-based elastomer and having an average molecular weight of 30,000 or less, when the process of the present invention is employed, no cushioning composite molded article of high quality can be obtained because open cells are formed by breakage of cell walls in an expansion step, huge cells are formed, or cracks or hollows are formed in the inner part.

In the case of a saturated-type styrene based elastomer having an A hardness according to JIS K6301 of more than 100, when the process of the present invention is employed, a cushioning composite molded article of high quality comprising a cushioning material coated with a surface material having good appearance and feel similar to those of, for example, natural leather cannot be obtained. In the case of a saturated-type styrene-based elastomer having an A hardness according to JIS K6301 of 50 or less, when the process of the present invention is employed, said substance expands well, but a cushioning composite molded article obtained by molding said elastomer has a sticky surface and is very flexible. Thus, a cushioning composite molded article of high quality cannot be obtained.

The saturated-type styrene-based elastomer may be used alone or as a compound with other elastomers, synthetic resins, fillers, etc. Particularly when the saturated-type styrene-based elastomer is in the form of a compound of the above-mentioned specified saturated-type styrene-based elastomer and a polyolefin, a cushioning composite molded article of high quality can very easily be obtained.

The polyolefin usable in the compound of the specified saturated-type styrene-based elastomer and the polyolefin includes, for example, polyolefins such as low-density polyethylenes, linear low-density polyethylenes, high-density polyethylenes, polypropylenes, polybutenes, etc.; ethylene-based copolymers of ethylene and other olefin monomers; ethylene-based copolymers of ethylene and other vinyl monomers; propylene-based copolymers of propylene and other olefin monomers; and olefin-based elastomer, such as ethylene-propylene based elastomer.

Particularly when the saturated-type styrene-based elastomer is in the form of a compound of the above specified saturated-type styrene-based elastomer and the polyolefin, the A hardness according to JIS K6301 of this compound should be in the range of not more than 100 and more than 50. When the A hardness is outside this range, no flexible cushioning composite molded article of high quality comprising a cushioning material coated with a surface material having good appearance and feel similar to those of, for example, natural leather can be obtained by the process of the present invention.

The melt viscosity of said compound at a temperature at which said compound is injected in the process of the present invention should be in the range of not more than 3,000 poise and not less than 300 poise at a shear rate of 1,000/sec and in the range of not more than 50,000 poise and not less than 5,000 poise at a shear rate of 10/sec. When the melt viscosity is outside these ranges, no cushioning composite molded article of high quality comprising a cushioning material coated with a surface material having good appearance and feel similar to those of, for example, natural leather can be obtained by the process of the present invention. Particularly when the melt viscosity at a shear rate of 1,000/sec exceeds 3,000 poise and the melt viscosity at a shear rate of 10/sec exceeds 50,000 poise, the process of the present invention does not permit satisfactory molding of said compound and its expansion.

The present invention is explained below in further detail.

In the insert·space-in-mold enlarging process, i.e., the first embodiment of production of the composite molded article of the present invention, and the two-layer molding·space-in-mold enlarging process, i.e., the second embodiment, the most preferable average molecular weight of the expandable elastomer for the most important step therein, the step of forming a surface material and a cushioning material is not more than 60,000 and not less than 40,000. A method using a thermoplastic elastomer having a relatively high molecular weight and a thermoplastic elastomer having a relatively low molecular weight by mixing them in such a manner that an average molecular weight of the resultant mixture becomes not less than 40,000 but not more than 60,000, is also a preferable method. The resultant mixture has both the characteristics of the thermoplastic elastomer having a relatively high molecular weight and those of the thermoplastic elastomer having a relatively low molecular weight, and thus can be free from the defects of the two thermoplastic elastomers. When the average molecular weight of thermoplastic elastomer is increased, the melt viscosity of the thermoplastic elastomer at the time of molding is increased, so that the strength and heat resistance of a molded article are improved, but production of a thin and large molded article and the expansion become difficult. On the other hand, when the average molecular weight of thermoplastic elastomer is decreased, the melt viscosity of the thermoplastic elastomer at the time of molding is decreased, so that the production of a thin and large molded article and the expansion become easy, but the strength and heat resistance of a molded article are deteriorated. Therefore, it is most preferable to choose the most suitable average molecular weight of thermoplastic elastomer in the range of not more than 60,000 and not less than 40,000 depending on the shape, dimensions and required characteristics of a molded article.

According to the process of the present invention, the thickness of the surface material and the expansion ratio of the cushioning material can be optionally determined by proper determination of molding conditions, and hence a flexible cushioning composite molded article of high quality can be obtained by adjusting the thickness of the surface material to a small thickness and the expansion ratio of the cushioning material to a high ratio, even when the A hardness according to JIS K6301 of the saturated-type styrene-based elastomer is relatively high. However, when the A hardness according to JIS K6301 exceeds 100, the resulting cushioning composite molded article is too rigid and there cannot be obtained a flexible cushioning composite molded article of high quality which is intended according to the present invention. A flexible cushioning composite molded article of high quality can be obtained by adjusting the thickness of the surface material to a large thickness and the expansion ratio of the cushioning material to a low ratio, even when the A hardness according to JIS K6301 of the saturated-type styrene-based elastomer is relatively low. However, when the A hardness according to JIS K6301 is 50 or less, the resulting cushioning composite molded article has a sticky surface and is markedly Thus, it does not form a cushioning composite molded article of high quality which is intended according to the present invention.

As to conditions of the injection molding of the expandable elastomer in the step of forming the surface material and the cushioning layer, it is most important to determine properly the temperature of molten elastomer in an injection cylinder, the pressure of the molten elastomer in the injection cylinder until the initiation of injection (the back pressure), the pressure of the molten elastomer in the injection cylinder at the time of the injection (the injection pressure), the temperature of the inner surface of a mold, the thermal conductivity of the mold, the period between the initiation and completion of the injection (the injection time), the interval between the completion of the injection and the initiation of backward movement of a movable mold (the initiation of primary mold opening) (the interval to the initiation of mold opening), the period between the initiation and completion of the backward movement of the movable mold (the time required for the mold opening), and the interval between the completion of backward movement of the movable mold and the initiation of mold opening (the initiation of secondary mold opening) (the cooling time).

The temperature of the molten elastomer in an injection cylinder is set in the range of 190°–270° C.

The pressure of the molten elastomer in the injection cylinder until the initiation of the injection (the back pressure) is set in the range of 10 kg/cm$^2$ to 500 kg/cm$^2$. A gas for expansion generated by the decomposition of a chemical blowing agent should be completely dissolved in the molten elastomer, and hence the pressure should be set at a pressure at which the chemical blowing agent is completely dissolved. Usually, the pressure is preferably set in the range of 20 kg/cm$^2$ to 100 kg/cm$^2$.

The pressure of the molten elastomer in the injection cylinder at the time of the injection (the injection pressure) is set in the range of 100 kg/cm$^2$ to 1,500 kg/cm$^2$. It is preferably set in the range of 300 kg/cm$^2$ to 1,000 kg/cm$^2$.

The temperature of the inner surface of the mold is set in the range of 0°–80° C. Although it is usually sufficient that the temperature is set in the range of 10°–30° C., the temperature is preferably set at a relatively high temperature when an elastomer high molecular weight is used or when a compound comprising an elastomer having a high melt viscosity is used. When the temperature of the inner surface of the mold is set at a relatively high temperature, it becomes necessary to adjust the interval between the completion of the injection and the initiation of backward movement of the movable mold (the initiation of primary mold opening) to a long time or adjust the period between the initiation and completion of the backward movement of the movable mold to a long time.

A material for the mold is not particularly limited and all of generally used metals can be suitably used. For improving the transcription of the surface pattern of the mold, it is possible to coat the surface of the mold with a highly heat insulating material or use a mold made of a material having a low thermal conductivity, such as a resin mold or a ceramic mold. When the surface of the mold is coated with a highly heat insulating material or when a mold made of a material having a low thermal conductivity, such as a resin mold or a ceramic mold is used, it becomes necessary to adjust the interval between the completion of the injection and the initiation of backward movement of the movable mold (the initiation of primary mold opening) to a long time or adjust the period between the initiation and completion of the backward movement of the movable mold to a long time. A leather pattern or other patterns may be formed on the surface of the mold which comes into direct contact with the surface material, so as to make it possible to transfer the pattern to the surface material, depending on application purposes of the composite molded article.

The period between the initiation and completion of the injection (the injection time) should be adjusted to as short a time as possible. Usually, it is adjusted to preferably 5 seconds or less, more preferably 1 second or less, most preferably 0.5 second or less. When the period between the initiation and completion of the injection is too long, expansion begins before the completion of the injection, so that no satisfactory molded article can be produced. Although it is difficult in some cases to adjust the period to a very short time in the case of a large-sized molded article, the period should be adjusted to a minimum as possible.

The adjustment of the interval between the completion of the injection and the initiation of backward movement of the movable mold (the initiation of primary mold opening) (the interval to the initiation of mold opening) is very important, and the interval should be adjusted to a minimum as possible. Preferably, the interval is adjusted to 30 seconds or less, more preferably 5 seconds or less. It is often preferable to adjust the interval to 1 second or less. The thickness of the surface material can be reduced by adjusting the interval to a short time, and it can be increased by adjusting the interval to a long time. When the A hardness according to JIS K6301 of the elastomer is relatively high, a molded article of good quality can be obtained by reducing the thickness of the surface material by adjusting the interval to a relatively short time. When the A hardness according to JIS K6301 of the elastomer is relatively low, a molded article of good quality can be obtained by increasing the thickness of the surface material by adjusting the interval to a relatively long time. When the interval is too long, the elastomer is not expanded. When the interval is too short, no satisfactory surface material is formed.

The adjustment of the period between the initiation and completion of the backward movement of the movable mold (the time required for the mold opening) is very important, and the period should be properly adjusted. Preferably, the period is adjusted to 30 seconds or less. The thickness of the surface material can be reduced by adjusting the period to a short time, and it can be increased by adjusting the period to a long time. When the A hardness according to JIS K6301 of the elastomer is relatively high, a molded article of good quality can be obtained by reducing the thickness of the surface material by adjusting the interval to a relatively short time. When the A hardness according to JIS K6301 of the elastomer is relatively low, a molded article of good quality can be obtained by increasing the thickness of the surface material by adjusting the interval to a relatively long time. When the period is too long, the elastomer is not expanded. When the period is too short, no satisfactory surface material is formed.

The interval (the cooling time) between the completion of backward movement of the movable mold and the initiation of mold opening (the initiation of secondary mold opening) is preferably adjusted to a somewhat long time. Preferably, the interval is adjusted to 30 seconds or more. When the interval is too short, expansion continues till after the initiation of mold opening (the initiation of secondary mold opening), so that no molded article of good quality can be obtained in some cases.

The elastomer used in the present invention is one which is expandable and contains a blowing agent. Any blowing agent may be used so long as it makes it possible to expand and mold the elastomer by injection molding. There can be used, for example, organic chemical blowing agents such as azo compounds (e.g. azodicarbonamide), nitroso compounds (e.g. N,N'-dinitrosopentamethylenetetramine), etc., and inorganic chemical blowing agents such as sodium carbonate, sodium bicarbonate, etc. Simultaneous use of the organic chemical blowing agents and the inorganic chemical blowing agents is also a good method.

When the expansion and molding are carried out at a relatively high temperature, azodicarbonamide and sodium bicarbonate are preferable though there can also be used compounds such as p,p'-oxybis(benzene sulfonyl semicarbazide), p-toluenesulfonyl semicarbazide, trihydrazinotriazine, barium azodicarboxylate, etc.

Needless to say, these blowing agents may contain various expansion assistants.

As the rigid resin which constitutes the insert substrate or the rigid substrate formed by two-layer molding in the present invention, there may be used any rigid thermoplastic resin which can be injection-molded. There can be used, for example, polyolefin resins such as polyethylenes, polypropylenes, etc.; polystyrene resins such as polystyrenes, acrylonitrile-styrene copolymer resins, acrylonitrile-butadienestyrene copolymer resins, etc.; modified polyphenylene ether resins; polyamide resins such as polyamide 6, polyamide 6,6, etc.; polyester resins such as poly(ethyleneterephthalate) resins, poly(butylene terephthalate) resins, etc.; polyoxymethylene resins such as polyoxymethylene homopolymers, polyoxymethylene copolymers, etc.; and poly(methylmethacrylate) resins.

Either a single rigid resin or a blend of a plurality of rigid resins can be used. In addition, there may be used compounds of rigid resins and other synthetic resins, elastomers, fillers, reinforcing materials, etc.

The rigid resin preferably has a low specific gravity for the reduction of the weight of a cushioning composite molded article to be obtained. From this point of view, the polyolefin resins and the polystyrene resins are preferable.

The elastomer which constitutes the above-mentioned surface material and cushioning material and the rigid resin which constitutes the aforesaid rigid substrate are preferably materials which are compatible with each other and are similar in kind if possible, for recycling the elastomer and the rigid resin together without separating them. However, in general, even if there are used an elastomer and a rigid resin which are not compatible with each other, they can be recycled after being compatibilized by the use of a compatibilizing agent at the time of recycling.

Next, procedures according to the present invention are explained below.

(1) As to the invention of the insert•space-in-mold enlarging process (the first embodiment).

The procedure in the insert•space-in-mold enlarging process is explained below with reference to FIG. 1.

An injection molding machine used in the insert•space-in-mold enlarging process is conventionl, with one injection unit.

First, as shown in FIG. 1(a), a rigid-resin molded product 1 is set in a mold 2. The rigid-resin molded product 1 constitutes a rigid substrate 9 of the cushioning composite molded article 5 shown in FIG. 2(a). It is sufficient that the rigid-resin molded product 1 is produced so as to have a shape required of the rigid substrate 9, by a molding method using the rigid resin. In general, an injection-molded product is used as the rigid-resin molded product 1, and also a pressure-molded product, a vacuum-formed product or the like may be substituted therefor.

The setting of the rigid-resin molded product 1 in the mold 2 is carried out along a stationary mold 2a or a movable mold 2b. In the drawing, the setting is carried out along the movable mold 2b.

Then, as shown in FIG. 1(b) (step (b)), an expandable elastomer 3 is injected into the space in the mold 2 equipped with the aforesaid rigid-resin molded article 1, to fill the space in the mold 2 completely. That is, full shot of the expandable elastomer 3 is carried out.

The thickness of the space in the mold 2 which is to be filled with the expandable elastomer 3 is preferably in the range of 0.5 to 4 mm, more preferably in the range of 1 to 3 mm. When the thickness is too small, the expansion of the expandable elastomer 3 becomes difficult. When the thickness is too large, the expandable elastomer 3 expands well but the resulting molded article is unnecessarily heavy and not economical. Therefore, it is not desirable. For uniform expansion of the whole expandable elastomer 3, it is preferable that the thickness of the space in the mold 2 which is to be filled with the expandable elastomer 3 be uniform. However, depending on application purposes of a cushioning composite molded article 5 to be obtained (see FIG. 2), it is preferable in some cases to cause nonuniform expansion intentionally by making the thickness of the space nonuniform purposely.

What is important in the step (b) is the full shot of the expandable elastomer 3 into the space. When the full shot is carried out, the elastomer 3 is in a substantially non-expanded state in this step because its expansion is prevented by a pressure accompanying the injection though the substance is expandable. And owing to the full shot, the elastomer 3 comes into close contact with the inner surface of the mold 2, so that the surface portion of the elastomer 3 in contact with the inner surface of the mold 2 is cooled, is hardly expanded in subsequent steps, and constitutes a so-called skin layer 4 (a non-expanded surface material). The skin layer 4 becomes the surface material 6 of the cushioning composite molded article 5 shown in FIG. 2(b), and since it is formed in a substantially non-expanded state in close contact with the inner surface of the mold 2, it has a satisfactory surface profile having a correct transcript of the surface pattern of the mold.

On the other hand, when the expandable elastomer 3 is injected in an amount insufficient to fill the space in the mold 2 (short shot) instead of carrying out the above-mentioned full shot into the space in the mold, the expandable elastomer 3 is expanded in this step. The expandable elastomer 3 comes into close contact with the inner surface of the mold 2 owing to an increase of its volume caused by the expansion, so that its surface is cooled. The surface thus obtained is rough because it is a surface cooled after the expansion, and there is not formed a practical surface material similar in appearance and feel to, for example, natural leather, which is intended according to the present invention.

After the above-mentioned complete injection into the space in the mold, the inside of the mold 2 is enlarged by moving the movable mold 2b by removal of the injection pressure, while the inner part of the expandable elastomer 3 is in an expand-able state. The enlargement of the inside of the mold 2 may be carried out by either a method in which as shown in FIG. 1(c) (step (c)) where, the enlargement is carried out in the mold 2 in an unopen state, without separating the stationary mold 2a and the movable mold 2b (a core shutting-in method), or a method shown in FIG. 1(d) (step (d)) where, the enlargement is carried out by opening the mold 2 by separating the stationary mold 2a and the movable mold 2b (a core opening method). The inside of the mold 2 may be partly enlarged by moving a movable block set in a part of the stationary mold 2a or the movable mold 2b, without moving the whole movable mold 2b.

Owing to the enlargement, as shown in FIGS. 1(e) (step (e)) and 1(f) (step (f)), the expandable elastomer 3 is expanded to become an expanded elastomer 7. The expanded elastomer 7 constitutes the cushioning material 8 of the cushioning composite molded article 5 shown in FIG. 2(a).

In the case of the core opening step (d), since the expandable elastomer 3 is freely expanded with its surface apart from the mold 2, the surface becomes smooth and curved and the expandable elastomer 3 becomes an expanded product 7 having a relatively high expansion ratio. On the other hand, in the case of the core shutting-in step (c), the expansion can be carried out while controlling the thickness of the expanded elastomer 7 to be obtained, by adjusting the degree of movement of the movable mold 2b.

For obtaining the skin layer 4 (the surface material) having a satisfactory surface profile in the above step (b) and for attaining a good expanded state of the expandable elastomer 3 in the steps (c) and (e) or (d) and (f), it is necessary to set the temperature of the mold 2 in the steps from the above step (b) to the step (c) or (d) properly.

Although the preset temperature of the mold 2 in the steps from the above step (b) to the step (c) or (d) is varied depending on the kind of the expandable elastomer 3 used, the temperature is set in a temperature range in which the expandable elastomer 3 can be sufficiently solidified. Usually, room temperature or a temperature close thereto is sufficient. It is also effective to coat, if necessary, the inner surface of the mold 2 with a heat insulating layer of a material having a low thermal conductivity, or make the whole mold 2 out of a material having a low thermal conductivity.

It is in some cases effective to heat the mold 2 previously in a temperature range in which the expandable elastomer 3 can be sufficiently solidified. A method in which the heating of the mold 2 is conducted only on the inner surface of the mold 2 by a radio frequency induction heating method or the like is an example of preferable method.

The interval between the completion of injection of the elastomer 3 into the mold 2 and the initiation of backward movement of the movable mold 2b (the interval to the initiation of mold opening) is preferably adjusted depending on the kind of the elastomer 3, the temperature of inner surface of the mold 2 (the temperature of the elastomer 3), etc., for attaining a good expanded state of the elastomer 3 in the step (c) or (d).

For example, when the elastomer 3 used is relatively rigid, the elastomer becomes difficult to expand even by the backward movement of the movable mold 2b when the skin layer 4 becomes thick. Therefore, it is preferable to make possible the maintenance of the inner surface of the mold 2 at a relatively high temperature and move the movable mold 2b backward soon after the injection of the expandable elastomer 3. When the elastomer 3 used is relatively flexible, it is preferable to move the movable mold 2b backward after a relatively long interval between the completion of injection of the expandable elastomer 3 and the initiation of backward movement of the movable mold 2b, for accelerating the formation of the skin layer 4 having a satisfactory surface profile.

The period between the initiation and completion of the backward movement of the movable mold 2b is important for attaining a good expanded state of the expandable elastomer 3 in the step (c) or (d), and is preferably properly adjusted like the interval between the completion of the injection and the initiation of backward movement of the movable mold 2b.

Figure 2B:
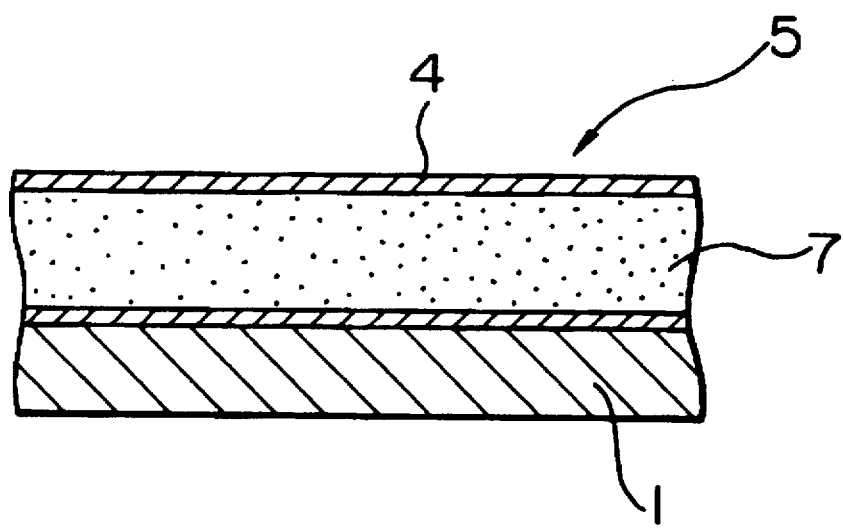

When the expanded elastomer 7 having the skin layer 4 is obtained by expanding the expandable elastomer 3 in the manner described above, sufficiently cooled and then taken out of the mold, there can be obtained the cushioning composite molded article 5 in which as shown in FIG. 2(a), the cushioning material 8 having the surface material 6 is integrally formed on the rigid material 9.

(2) As to the invention of the two-layer molding•space-in-mold enlarging process (the second embodiment).

The procedure in the two-layer molding•space-in-mold enlarging process is explained below with reference to FIGS. 3(a)–3(g).

An injection molding machine used in the invention of the two-layer molding•space-in-mold enlarging process has two or more injection units which is generally called a two-color molding machine or a multi-color molding machine.

First, as shown in FIG. 3(a), a rigid resin is injected into a mold 2' composed of a stationary mold 2a' and a movable mold 2b to obtain a rigid-resin molded product 1. The molding into the rigid-resin molded product 1 may be carried out until the rigid resin injected into the mold 2' is sufficiently cooled, or the molding may be stopped at a cooled state in which the rigid resin is not deformed at the time of its transfer to a subsequent step.

Then, as shown in FIG. 3(b), the movable mold 2b is moved backward to be separated from the stationary mold 2a', and is combined with another stationary mold 2a, whereby the inside of the mold 2 is enlarged to form a space in the mold 2. The enlargement of inside of the mold 2 can be carried out also as the enlargement of inside of the mold 2' shown in FIG. 3(a). For example, the inside of the mold 2' may be partly enlarged by moving a movable block set in a part of the stationary mold 2a' or the movable mold 2b. In addition, the inside of the mold 2' may be enlarged by moving the movable mold 2b to such an extent that the mold 2' shown in FIG. 3(a) is not opened. The step (b) corresponds to the above-mentioned state shown in FIG. 1(a), and subsequent steps shown in FIGS. 3(c) to 3(g) of the procedure are the same as the steps illustrated in FIGS. 1(b) to 1(f).

In the insert•space-in-mold enlarging process previously described, the rigid-resin molded product 1 which becomes the rigid substrate 9 is previously and separately produced, and the formation of the surface material 6 and the cushioning material 8 and the union of the cushioning material 8 and the rigid substrate 9 in a body are carried out in one mold, i.e., the mold 2. On the other hand, the two-layer•space-in-mold enlarging process can be practiced without taking the rigid-resin molded article 1 which becomes the rigid substrate 9, out of the mold 2', and hence is advantageous in that since an expandable elastomer 3 can be injected while the rigid-resin molded product 1 has a relatively high temperature, the state of their joining can easily be improved. Furthermore, for the same reason, it is possible to make the skin layer 4 very thin formed during the injection of the expandable elastomer 3, in a portion of the substance in which the substance comes into contact with the rigid-resin molded product 1.

[EXAMPLES] AND [COMPARATIVE EXAMPLES]

The present invention is concretely illustrated below with examples and comparative examples, but needless to say, the present invention is not limited by the examples and the comparative examples.

Materials, an equipment and a molding procedure which were employed in them are as follows.

(1) Materials
Rigid resins

PP: a polypropylene having an MFR at 230° C. according to ASTM D1238 of 8 g/10 min and a density according to ASTM D1505 of 0.90 g/cm$^2$.

GPP: a glass fiber-reinforced polypropylene having an MFR at 230° C. according to ASTM D1238 of 7 g/10 min and a density according to ASTM D1505 of 1.12 g/cm$^2$.

Elastomers

SB1: a saturated-type styrene-butadiene based elastomer and having an average molecular weight of 50,000 as measured by a GPC method and an A hardness according to JIS K6301 of 67, and a styrene content of 20% by weight.

SB2: a saturated-type styrene-butadiene based elastomer, having an average molecular weight of 40,000 as measured by a GPC method and an A hardness according to JIS K6301 of 84, and a styrene content of 30% by weight.

SB3: a compound of saturated-type styrene-butadiene based elastomer and polyolefins which has an A hardness according to JIS K6301 of 74 and melt viscosity values at 230° C. of 1,800 poise at a shear rate of 1,000/sec and 18,000 poise at a shear rate of 10/sec, and consists of 60 parts by weight of a saturated-type styrene-butadiene based elastomer, having an average molecular weight of 50,000 as measured by a GPC method and an A hardness according to JIS K6301 of 67, and a styrene content of 20% by weight, of 20 parts by weight of a saturated-type styrene-butadiene based elastomer, having an average molecular weight of 70,000 as measured by a GPC method and an A hardness according to JIS K6301 of 67, and a styrene content of 20% by weight of 5 parts by weight of a linear low-density polyethylene having an MFR at 190° C. according to ASTM D1238 of 19 g/10 min and a density according to ASTM D1505 of 0.93 g/cm$^2$, and of 20 parts by weight of a polypropylene having an MFR at 230° C. according to ASTM D1238 of 40 g/10 min and a density according to ASTM D1505 of 0.90 g/cm$^2$.

Blowing agents
BA1: an azodicarbonamide-based blowing agent
BA2: a sodium bicarbonate-based blowing agent (2) Molding equipment
A core rotation type, two-color, different-materials injection molding machine.

(3) Dimensions and outer shape of a molded article (those before expansion)

A box shape with a width of 74 mm, a length of 100 mm and a height of 10 mm. The thickness of a portion filled with a rigid resin (a rigid-resin molded product) is 2 mm, and the thickness of a portion filled with an expandable elastomer is 3 mm or 2 mm.

(4) Molding procedure

A granular rigid resin is put into the resin feed opening of the first injection unit of the molding machine, and a mixture of a granular elastomer and a powdered blowing agent is put into the resin feed opening of the second injection unit.

Using the first injection unit, the rigid resin is injected into a mold having a space corresponding to a rigid-resin molded article to produce the rigid-resin molded article.

After the rigid-resin molded article is cooled to such an extent that it can be taken out, the movable mold of the mold is moved backward, rotated, and then connected to a stationary mold for the second injection unit to form a space into which the expandable elastomer is to be injected. Using the second injection unit, the expandable elastomer is injected into the space in the mold.

After the surface layer of the injected expandable elastomer is solidified and while the inner part is in a molten state and is expandable, the movable mold is moved backward to expand the inner part of the elastomer. The enlargement of the inside of the mold by the backward movement of the movable mold is carried out by the core opening method in Example 1, Comparative Example 1, Example 2 and Comparative Example 2, or the core shutting-in method in Example 3.

After an expanded elastomer formed by the expansion of the expandable elastomer is sufficiently cooled, the cushioning composite molded article thus produced is taken out of the mold.

Example 1

Molding was conducted by carrying out the enlargement of the inside of the mold by the backward movement of the movable mold according to the core opening method, and varying the kind of rigid resin, the kind of elastomer and the kind of blowing agent. The injection of an expandable elastomer was full shot in all the cases. Conditions and the results are shown in Table 1.

Cushioning composite molded articles having an excellent appearance and proper cushioning properties could be produced even when the kind of rigid resin was varied.

In addition, cushioning composite molded articles having an excellent appearance and proper cushioning properties could be produced even when the kind of elastomer was varied. However, the molded state varied depending on the kind of elastomer. In particular, the cushioning properties of the obtained cushioning composite molded articles varied depending on the rigidity of the elastomer.

Furthermore, when the kind of blowing agent was varied, both of the blowing agents could be advantageously used.

Comparative Example 1

A cushioning composite molded article was produced by injecting an expandable elastomer in a short shot manner. Conditions and the results are shown in Table 1.

No satisfactory molded article could be produced.

Example 2

Molding was conducted by carrying out the enlargement of the inside of the mold by the backward movement of the movable mold according to the core opening method, and varying the amount of a blowing agent added. The injection of an expandable elastomer was full shot in all the cases. Conditions and the results are shown in Table 2.

The cushioning properties of the resulting cushioning composite molded articles varied depending on the amount of the blowing agent added.

In addition, molding was conducted by carrying out the enlargement of the inside of the mold by the backward movement of the movable mold according to the core opening method, and varying the mold temperature and the interval between the completion of injection of the elastomer and the initiation of backward movement of the movable mold (the interval to the initiation of mold opening). The injection of the expandable elastomer was full shot in all the cases. Conditions and the results are shown in Table 2.

A proper interval to the initiation of mold opening varied owing to the variation of the mold temperature. In detail, when the mold temperature was raised, a satisfactory cushioning composite molded article could be obtained even when the interval to the initiation of mold opening was extended.

Comparative Example 2

Molding was carried out by varying the interval to the initiation of mold opening greatly.

When the interval to the initiation of mold opening was beyond its proper range, no satisfactory molded article could be produced.

Example 3

Molding was conducted by carrying out the enlargement of the inside-of the mold by the backward movement of the movable mold according to the core shutting-in method, and varying the kind of blowing agent, the thickness of a portion filled with an expandable elastomer, and the kind of elastomer. The injection of the expandable elastomer was full shot in all the cases. Conditions and the results are shown in Table 3.

Even in the case of the core shutting-in method, a good expanded state could be attained even when there were varied the kind of blowing agent, the thickness of the portion filled with the expandable elastomer, and the kind of elastomer.

Physical properties of molded articles were evaluated according to the following criteria.

State of expansion

Good: a state in which a non-expanded surface material was uniformly formed on the surface of a molded article to a uniform thickness, and a cushioning material having a large number of uniform and fine closed cells was uniformly formed in the inside.

Bad: an expanded state of a molded article which is different from the above state.

Appearance

Good: a state in which the surface pattern of the mold was correctly transferred to the surface of a molded article.

Poor: a state in which a pattern different from the surface pattern of the mold, such as depressions and protuberances, a flow mark or the like was formed on the surface of a molded article.

Feel

Good: a feel similar to the good feel of a cushioning composite molded article composed of a surface material made of smooth natural leather of adult cattle obtained by chromium tanning, a cushioning material made of a flexible closed-cell polyurethane foam, and a rigid substrate.

Unpleasant: a feel different from the above good feel.

TABLE 1

|  | Example 1 | | | | Comparative Example 1 |
| --- | --- | --- | --- | --- | --- |
| No. of experiment | 1-1 | 1-2 | 1-3 | 1-4 | 1-1 |
| Materials |  |  |  |  |  |
| Rigid resin | PP | GPP | PP | GPP | GPP |
| Elastomer | SB1 | SB1 | SB2 | SB1 | SB1 |
| Blowing agent (kind) | BA1 | BA1 | BA1 | BA2 | BA1 |
| Blowing agent (adding amount, wt %) | 4 | 4 | 4 | 4 | 4 |
| Molding conditions |  |  |  |  |  |
| Thickness of a portion of mold for the elastomer (mm) | 3 | 3 | 3 | 3 | 3 |
| State of charging with the elastomer | Full shot | Full shot | Full shot | Full shot | Short shot |
| Temp. of molten elastomer (°C.) | 205 | 205 | 205 | 205 | 205 |
| Mold Temp. (°C.) | 30 | 30 | 30 | 30 | 30 |
| Interval to the initiation of mold opening (sec) | 17 | 17 | 17 | 20 | 20 |
| Method of core backward movement | Core liberating method | Core liberating method | Core liberating method | Core liberating method | Core liberating method |
| Physical properties of molded article |  |  |  |  |  |
| State of expansion | Good | Good | Good | Good | A small number of cells, nonuniform |
| Appearance | Good, dull | Good, dull | Good, dull | Good, dull | Poor, a very rough surface |
| Feel | Good, soft | Good, soft | Good, somewhat hard | Good, soft | Unpleasant, hard |

TABLE 2

|  | Example 2 | | | | Comparative Example 2 |
| --- | --- | --- | --- | --- | --- |
| No. of experiment | 2-1 | 2-2 | 2-3 | 2-4 | 2-1 |
| Materials |  |  |  |  |  |
| Rigid resin | PP | PP | PP | GPP | GPP |
| Elastomer | SB1 | SB1 | SB1 | SB1 | SB1 |
| Blowing agent (kind) | BA1 | BA1 | BA1 | BA1 | BA1 |
| Blowing agent (adding amount, wt %) | 1 | 2 | 4 | 4 | 4 |
| Molding conditions |  |  |  |  |  |
| Thickness of a portion of mold for the elastomer (mm) | 3 | 3 | 3 | 3 | 3 |
| State of charging with the elastomer | Full shot | Full shot | Full shot | Full shot | Full shot |
| Temp. of molten elastomer (°C.) | 205 | 205 | 205 | 205 | 205 |
| Mold Temp. (°C.) | 30 | 30 | 30 | 30 | 30 |
| Interval to the initiation of mold opening (sec) | 17 | 17 | 17 | 30 | 30 |
| Method of core backward movement | Core liberating method | Core liberating method | Core liberating method | Core liberating method | Core liberating method |
| Physical properties of molded article |  |  |  |  |  |
| State of expansion | Good | Good | Good | Good | Not expanded |
| Appearance | Good, dull | Good, dull | Good, dull | Good, dull | Poor, a very rough surface |
| Feel | Good, somewhat hard | Good, soft | Good, soft | Good, soft | Unpleasant, hard |

TABLE 3

| No. of experiment | Example 3 | | | |
|---|---|---|---|---|
| | 1-1 | 1-2 | 1-3 | 1-4 |
| Materials | | | | |
| Rigid resin | PP | PP | PP | PP |
| Elastomer | SB1 | SB1 | SB1 | SB3 |
| Blowing agent (kind) | BA1 | BA2 | BA2 | BA2 |
| Blowing agent (adding amount, wt %) | 2 | 2 | 2 | 2 |
| Molding conditions | | | | |
| Thickness of a portion of mold for the elastomer (mm) | 3 | 3 | 2 | 2 |
| State of charging with the elastomer | Full shot | Full shot | Full shot | Full shot |
| Temp. of molten elastomer (°C.) | 230 | 230 | 230 | 230 |
| Mold Temp. (°C.) | 25 | 25 | 25 | 25 |
| Interval to the initiation of mold opening (sec) | 1 | 1 | 1 | 1 |
| Time required for mold opening (sec) | 2 | 2 | 2 | 2 |
| Background movement distance (sec) | 2 | 2 | 2 | 2 |
| Method of core backward movement | Core shutting-in method | Core shutting-in method | Core shutting-in method | Core shutting-in method |
| Physical properties of molded article | | | | |
| State of expansion | Good | Good | Good | Very good |
| Appearance | Good, dull | Good, dull | Good, dull | Very good, dull |
| Feel | Good, soft | Good, soft | Good, soft | Very good, soft |

<INDUSTRIAL APPLICABILITY>

The present invention is as explained above and has the following effects.

That is, in the first embodiment of the process for producing a composite molded article of the present invention, molding of a surface material, molding of a cushioning material, and union of the cushioning material and a rigid substrate in a body can be carried out in one mold, so that a saving in labor and a reduction in the production cost can be achieved in the production of a cushioning composite molded article. In the second embodiment of said process, since not only the above operations but also molding of a rigid substrate can be carried out in the same mold in succession, there can be achieved a greater saving in labor and a sharper reduction in the production cost than in the first embodiment.

A cushioning composite molded article obtained by said process gives an excellent appearance and a soft feel and hence is very useful as a material for various internal trims.

We claim:

1. A process for producing a cushioning composite molded article comprising the steps of:
   providing a rigid substrate in a mold having a space larger than said substrate, said substrate having been provided by one of the steps of
      placing a rigid substrate previously molded in a desired shape in a mold having a space larger than the rigid substrate, and
      injecting a resin into a mold having a desired shape and then enlarging the inside of the mold so that it has a space larger than said mold;
   injecting an expandable elastomer of a saturated-type styrene-based elastomer having an average molecular weight greater than 30,000 but not more than 70,000 as measured by a GPC method, and an A-hardness according to JIS K6301 of greater than 50 but not more than 100 into the space to form integrally on the rigid substrate an expanded layer of elastomer and a skin layer of the same elastomer over the expanded layer, said skin layer having been formed by cooling a portion of the expandable elastomer against the mold, said expandable elastomer filling said space; and then
   enlarging the inside of the mold further to expand said layer of the expandable elastomer to form a cushioning material coated with said surface material.

2. A cushioning composite molded article produced by a process set forth in claim 1.

3. An automotive part comprising a cushioning composite molded article produced by a process set forth in claim 1.

4. A process set forth in claim 1, wherein the elastomer is a compound further comprising a polyolefin, said compound having an A-hardness according to JIS K6301 of greater than 50 but not greater than 100, and a melt viscosity at a temperature of injection of not less than 300 poise but not greater than 3,000 poise at a shear rate of 1,000/sec and not less than 5,000 poise but not greater than 50,000 poise at a shear rate of 10/sec.

5. A cushioning composite molded article produced by a process set forth in claim 1, wherein the saturated-type styrene-based elastomer compound includes a polyolefin, said compound having an A-hardness according to JIS K6301 of greater than 50 but not greater than 100, and a melt viscosity at a temperature of injection of not less than 300 poise but not greater than 3,000 poise at a shear rate of 1,000/sec and not less than 5,000 poise but not greater than 50,000 poise at a shear rate of 10/sec.

6. A process for producing a cushioning composite molded article comprising the steps of:
   providing a substrate having a predetermined shape in a first portion of said cavity;
   injecting an expandable material to fill a second portion of said cavity under sufficient pressure so as to maintain said material in a non-expanded state, said second portion comprising the remainder of said cavity;

maintaining an inner surface of said mold against a first portion of said expandable material for a predetermined time interval so as to form a skin layer from said expandable material; and moving said mold members away from each other so as to allow a second portion of said expandable material to expand and form a cushioning material; wherein said expandable material is a compound comprising at least one saturated-type styrene-based elastomer and a polyolefin, said compound having an A-hardness according to JIS greater than 50 but not greater than 100, a melt viscosity between 500 and 5,000 at a shear rate of 10/sec.

7. A process for producing a cushioning composite molded article comprising the steps of:

providing a substrate having a predetermined shape in a first portion of said cavity;

injecting an expandable material to fill a second portion of said cavity under sufficient pressure so as to maintain said material in a non-expanded state, said second portion comprising the remainder of said cavity;

maintaining an inner surface of said mold against a first portion of said expandable material for a predetermined time interval so as to form a skin layer from said expandable material; and moving said mold members away from each other so as to allow a second portion of said expandable material to expand and form a cushioning material; wherein said expandable material comprises a saturated-type styrene-based elastomer having an average molecular weight between 30,000 and 70,000 as measured by a GPC method, and an A-hardness according to JIS K6301 greater than 50 but not greater than 100.

8. The process of claim 7 wherein said mold members are completely separated when they are moved away from each other.

9. The process of claim 7 wherein said second cavity portion is between 1 and 3 mm thick.

10. The process of claim 7 wherein said predetermined time interval is less than 5 seconds.

11. The process of claim 7 wherein said substrate is formed from a resin by one of a group of techniques consisting of injection-molding, pressure-molding and vacuum-forming.

12. A process for producing a cushioning composite molded article comprising the steps of:

providing a mold, said mold comprising first and second mold members, said mold members defining a first cavity therebetween;

injecting a resin into said first cavity to form a substrate;

moving said mold members away from each other to create a second cavity next to said substrate;

injecting an expandable material to fill said second cavity under sufficient pressure so as to maintain said material in a non-expanded state;

maintaining an inner surface of said mold against a first portion of said expandable material for a predetermined time interval so as to form a skin layer; and further moving said mold members away from each other so as to allow a second portion of said expandable material to expand and form a cushioning material.

13. The process of claim 12 wherein said expandable material comprises a saturated-type styrene-based elastomer having an average molecular weight between 30,000 and 70,000 as measured by a GPC method, and an A-hardness according to JIS K6301 of between 50 and 100.

14. The process of claim 13 comprising the additional step of replacing the second mold member with a third mold member before the step of injecting the expandable material.

15. The process of claim 12 wherein said expandable material is a compound comprising at least one saturated-type styrene-based elastomer and a polyolefin, said compound having an A-hardness according to JIS K6301 between 50 and 100, a melt viscosity between 300 and 3,000 poise at a shear rate of 1,000/sec and a melt viscosity between 5,000 and 50,000 poise at a shear rate of 10/sec.

16. A cushioning composite molded article produced by a process set forth in claim 15.

* * * * *

UNITED STATES PATENT AND TRADEMARK OFFICE
CERTIFICATE OF CORRECTION

PATENT NO. : 5,702,810

DATED : December 30, 1997

INVENTOR(S) : Koseki et al.

It is certified that errors appear in the above-identified patent and that said Letters Patent is hereby corrected as shown below:

Title page, item
[73] Assignee: should be corrected as shown below:

Add:

--Asahi Kasei Kogyo Kabushiki Kaisha,
  Osaka, Japan;

Toyota Jidosha Kabushiki Kaisha,
Toyota-shi, Japan;

Kabushiki Kaisha Kobe Seiko Sho,
Kobe 651, Japan;

Signed and Sealed this

Twentieth Day of October, 1998

Attest:

BRUCE LEHMAN

*Attesting Officer*  *Commissioner of Patents and Trademarks*